(12) United States Patent
Curtis et al.

(10) Patent No.: US 7,047,825 B2
(45) Date of Patent: May 23, 2006

(54) SENSOR ASSEMBLY FOR MEASURING WEIGHT APPLIED TO A VEHICLE SEAT

(75) Inventors: Brian M. Curtis, Lake Orion, MI (US); Michael Baker, Warren, MI (US)

(73) Assignee: Siemens VDO Automotive Corporation, Auburn Hills ( * ) Notice: Subject to any disclaimer, the term of this patent is extended or adjusted under 35 U.S.C. 154(b) by 0 days.

(21) Appl. No.: 11/046,990

(22) Filed: Jan. 31, 2005

(65) Prior Publication Data

US 2005/0150313 A1 Jul. 14, 2005

Related U.S. Application Data

(62) Division of application No. 10/010,471, filed on Nov. 8, 2001, now Pat. No. 6,882,281.

(60) Provisional application No. 60/253,519, filed on Nov. 28, 2000.

(51) Int. Cl.
*G01L 1/26* (2006.01)
(52) U.S. Cl. ................................. 73/862.391
(58) Field of Classification Search ..... 73/862–862.68, 73/862.361; 177/144, 136; 180/273, 282; 280/735; 701/45; 340/667, 562
See application file for complete search history.

(56) References Cited

U.S. PATENT DOCUMENTS

| | | | |
|---|---|---|---|
| 5,107,710 A * | 4/1992 | Huck et al. ............... | 73/708 |
| 5,474,327 A | 12/1995 | Schousek | |
| 6,039,344 A | 3/2000 | Mehney | |
| 6,069,325 A | 5/2000 | Aoki | |
| 6,070,115 A | 5/2000 | Oestreicher | |
| 6,092,838 A | 7/2000 | Walker | |
| 6,161,891 A * | 12/2000 | Blakesley ............... | 296/65.01 |
| 6,250,671 B1 * | 6/2001 | Osmer et al. ............ | 280/735 |
| 6,345,543 B1 * | 2/2002 | Aoki .................... | 73/862.474 |
| 6,571,647 B1 * | 6/2003 | Aoki et al. ............ | 73/862.381 |
| 6,677,539 B1 * | 1/2004 | Miura et al. ........... | 73/862.474 |

FOREIGN PATENT DOCUMENTS

| | | |
|---|---|---|
| DE | 3809074 A1 | 10/1989 |
| DE | 20004393 U1 | 8/2000 |
| DE | 10011371 A1 | 9/2000 |
| DE | 20012950 U1 | 11/2000 |
| EP | 0855307 A2 | 7/1998 |
| EP | 962362 A2 | 12/1999 |
| EP | 0962362 A2 | 12/1999 |
| GB | 2343953 A | 5/2000 |
| WO | WO 99/24285 | 5/1999 |
| WO | WO 00/50255 A1 | 8/2000 |

OTHER PUBLICATIONS

Int'l Search Report, dated Sep. 26, 2002.

* cited by examiner

*Primary Examiner*—Max Noori

(57) ABSTRACT

Weight sensor assemblies for measuring weight on a vehicle seat are mounted at the connecting points between a seat bottom frame and a seat mounting member. The weight sensor assemblies each include a beam member having a bendable center body portion for supporting a strain gage. The strain gage and associated traces are screen printed on the surface of the beam. The beam acts similar to a dual constrained cantilever beam, concentrating the bending at a reduced neck section that narrows in the middle of the center body portion. The strain gage measures strain resulting from bending in the center body portion caused by a weight force being applied against the seat.

20 Claims, 5 Drawing Sheets

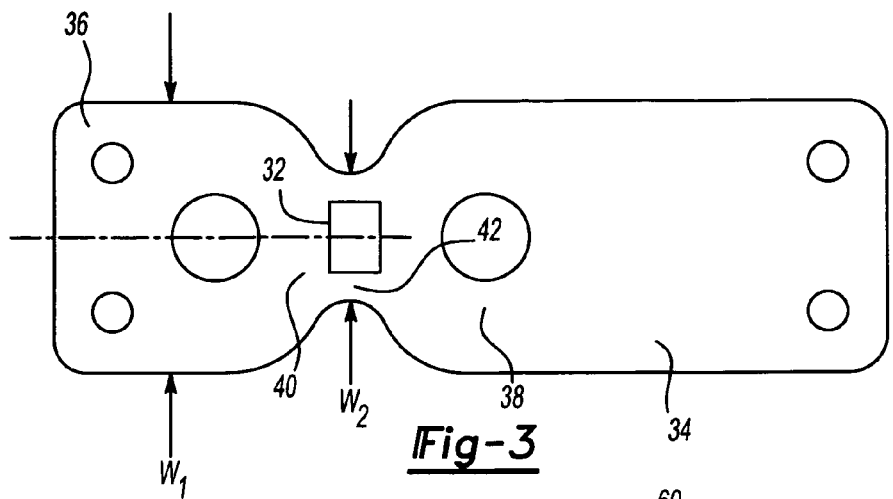
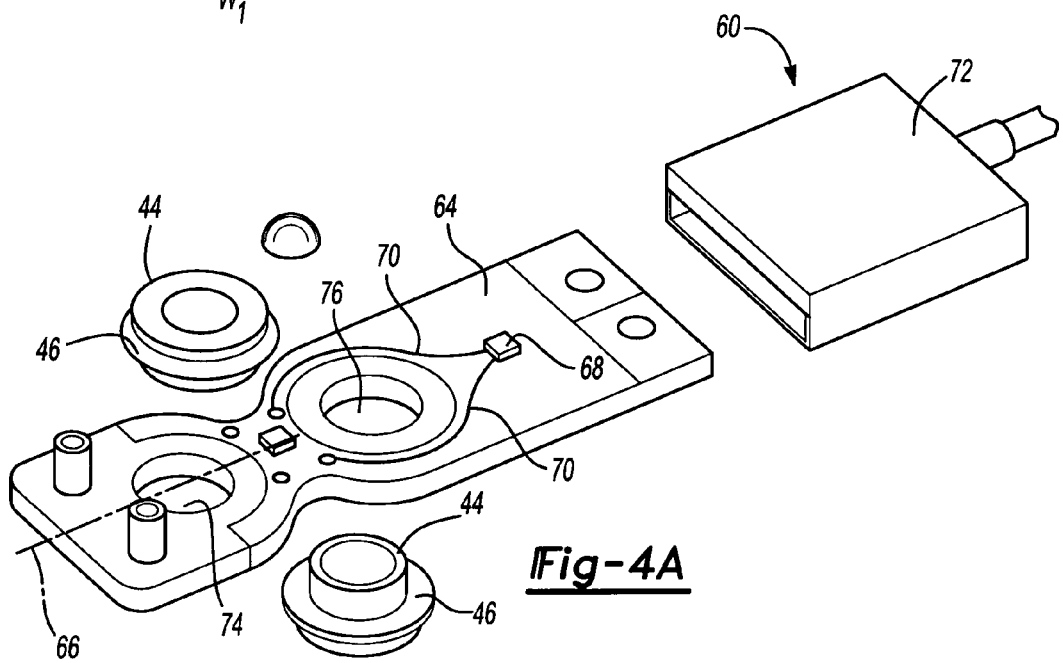
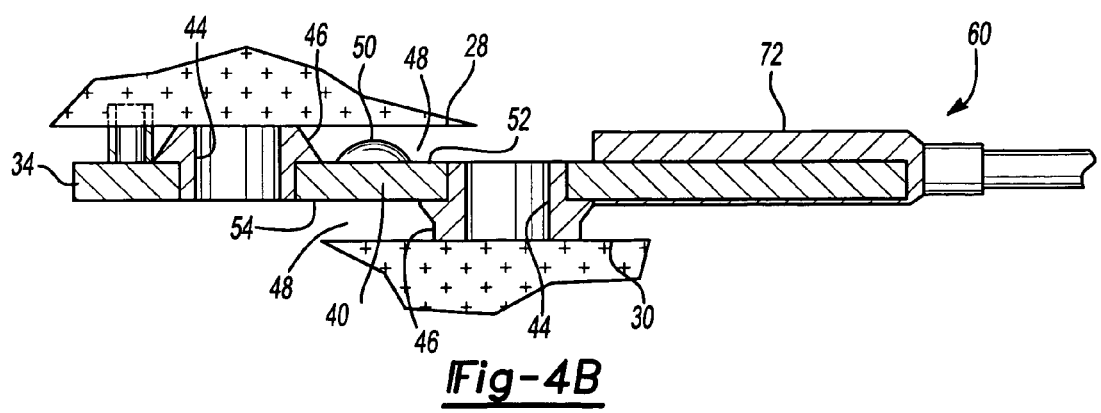

SENSOR ASSEMBLY FOR MEASURING WEIGHT APPLIED TO A VEHICLE SEAT

RELATED APPLICATION

This application is a divisional of U.S. application Ser. No. 10/010,471, which was filed on Nov. 8, 2001 now U.S. Pat. No. 6,882,281, which claims priority to provisional application 60/253,519 filed on Nov. 28, 2000.

BACKGROUND OF THE INVENTION

1. Field of the Invention

This invention relates to a sensor assembly for measuring the weight applied to a vehicle seat.

2. Related Art

Most vehicles include safety devices such as airbags and seatbelt restraint systems, which work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If there is an infant seat or small adult/child secured to the vehicle seat then the airbag should not be deployed or should be deployed at a significantly lower deployment force. One way to control the airbag deployment is to monitor the weight of the seat occupant.

Currently there are various types systems that use different types of sensors and mounting configurations to determine seat occupant weight. For example, some systems use pressure sensitive foil mats or a plurality of individual sensors mounted within a seat bottom foam cushion. One disadvantage with this type of system is that mounting the sensors within the cushion can be difficult and time consuming. For example, it is difficult to find sensor mounting locations within the cushion that will sufficiently accommodate all of the various positions of a seat occupant while still providing accurate measurements. Further, shifting of the occupant on the seat can dislodge or move the sensors out of their proper location, which compromises the accuracy of sensor measurements. Also, because the sensors are mounted within the cushion, it is difficult to reposition or replace the sensors after the seat has already been installed in the vehicle.

Another type of system mounts sensors between various structural components on a vehicle seat, such as between a seat frame member and a seat track. The sensors include a strain gage mounted on a bendable or deflectable body portion that measures the amount of strain in the deflectable body portion resulting from a weight force being exerted on the vehicle seat. The strain measurements from each of the sensors are combined to determine the total weight of the seat occupant. One disadvantage with this type of system is that due to the structural mounting configurations and requirements for seat assemblies, it is difficult to have accurate strain measurements at the lower strain ranges. In other words, because the sensor assemblies are connecting elements between the seat frame member and seat track member, the sensor assemblies must be strong and durable enough to provide secure connection point within the seat assembly but must also be able to provide a sufficient amount of bending/deflection so that the strain gages can measure strain accurately over a wide range of occupant sizes.

Thus, it is desirable to have an improved seat occupant weight measurement system that provides increased accuracy as well as overcoming any other of the above referenced deficiencies with prior art systems.

SUMMARY OF THE INVENTION

Weight sensor assemblies for measuring weight applied to a vehicle seat are installed between an upper seat structure and a lower seat structure. Each sensor assembly includes a bending beam with a first mount for mounting the beam to the upper seat structure, a second mount for mounting the beam to the lower seat structure, and a center body portion extending between the first and second mounts that exhibits bending behavior when a weight force is applied to the vehicle seat. The center body portion includes a neck portion that is narrower in width than the center body portion to concentrate bending in the neck portion. A strain gage is mounted on the beam at the neck portion to measure the strain caused by the bending. The strain measurements are transmitted to a central processing unit that determines the total weight. The processing unit generates a control signal for a safety device based on the weight determination.

In the preferred embodiment, the center body portion and the first and second mounts are formed in an hourglass shape. Thus, there is a smooth and curved transition from the first and second mounts to the neck portion of the center body portion. Preferably, the neck portion and the strain gage are positioned at an approximately equal distance from each of the first and second mounts.

In one embodiment, the beam includes an extension portion extending at one end beyond one of the first or second mounts for supporting an electronics package. The electronics package includes an electrical connector, circuit, and other necessary hardware that permit the strain gage to be connected to the processing unit. The extension portion preferably includes a mount for receiving the electrical connector via a linear insertion force along the length of the beam.

These and other features of the present invention can be best understood from the following specification and drawings, the following of which is a brief description.

BRIEF DESCRIPTION OF THE DRAWINGS

FIG. 3 is an overhead view of a beam member.

FIG. 4A is an exploded view of the subject weight sensor assembly.

FIG. 4B is a side cross-sectional view of an assembled weight sensor assembly shown in FIG. 4A.

DETAILED DESCRIPTION OF AN EXEMPLARY EMBODIMENT

Figure 1:
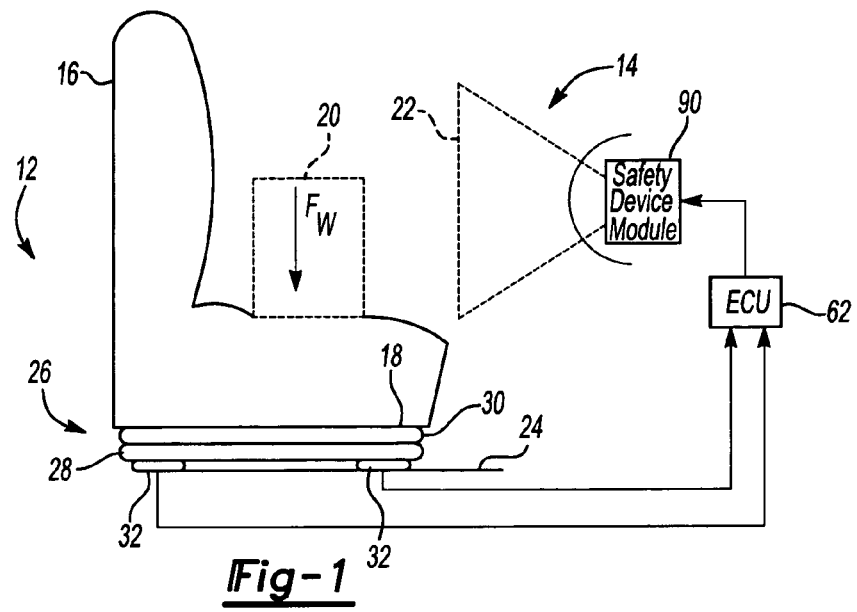
FIG. 1 is a schematic side view showing a vehicle with an airbag system and an occupant sitting in a seat with the airbag in an active state shown in dashed lines.

A vehicle includes a vehicle seat assembly, shown generally at 12 in FIG. 1, and an airbag system 14. The seat assembly 12 can be either a driver or passenger seat and includes a seat back 16 and a seat bottom 18. When a vehicle occupant 20 is seated on the seat 12 a weight force Fw is exerted against the seat bottom 18. The weight force Fw represents the weight of the seat occupant 20. The seat occupant 20 can be a large adult, a small adult, a child, an infant seat, or some type of package or other object.

The airbag system 14 deploys an airbag 22 under certain collision conditions. The deployment force for the airbag 22, shown in dashed lines in FIG. 1, varies according to the weight of the occupant 20. The vehicle includes a unique system for measuring the weight of the seat occupant 20. This unique system utilizes a frame integrated load cell configuration.

Figure 2:
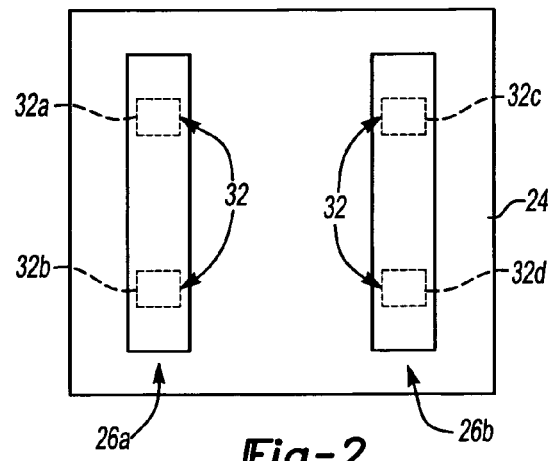
FIG. 2 a schematic overhead view of the seat shown in FIG. 1.

The seat 12 is preferably mounted to a lower structure 24 such as a riser or vehicle floor with a track assembly 26 to allow horizontal seat adjustment. The track assembly 26 includes an inboard track assembly 26a and an outboard track assembly 26b that is spaced apart from the inboard track assembly 26a by a predetermined distance (shown in FIG. 2). Both the inboard 26a and outboard 26b track assemblies include first 28 and second 30 track members. The first track member 28 is typically mounted to the lower structure 24. The second track member 30 is mounted for sliding movement relative to the first track member 28 so that seat 12 position can be adjusted forwardly and rearwardly within the vehicle to a desired position.

A plurality of sensor assemblies 32 are mounted between the first track members 28 of the inboard 26a and outboard 26b track assemblies and the lower structure 30. In the preferred embodiment, four (4) sensor assemblies 32 are used at each of the four (4) connecting points between the first tracks 28 and the lower structure 24. There is a first sensor assembly 32a positioned near the front of the inboard track assembly 26a, a second sensor assembly 32b positioned near the rear of the inboard track assembly 26a, a third sensor assembly 32c positioned near the front of the outboard track assembly 26b, and a fourth sensor assembly 32d positioned near the rear of the outboard track assembly 26b.

Preferably, each sensor assembly 32a, 32b, 32c, and 32d includes a beam member 34, shown in FIG. 3, that has a first portion 36 for mounting to the first track member 28 and a second portion 38 for mounting to the lower structure 30. A central bendable or deflectable portion 40 extends between the first 36 and second 38 portions of the sensor assembly 32. The bendable portion 40 includes a narrowing neck section 42 that concentrates the strain resulting from the weight force Fw at the neck section 42. The beam member 34 is defined by a first width W1 at the first 36 and second 38 portions. The neck section 42 is defined by a second width W2 that is narrower than the first width W1. Preferably, the first width W1 is approximately twice that of the second width W2, however, other ratios can be used depending upon the specific seat and mounting configurations.

As the weight force Fw of the seat occupant 20 is exerted against the seat bottom 18, the central bendable portion 40 of each sensor assembly 32a, 32b, 32c, 32d deflects or bends into an S-shaped configuration putting one portion of the sensor 32 in compression and another portion in tension. The strain generated during this bending is measured by the sensor assembly 32. Output from each of the sensor assemblies 32a, 32b, 32c, 32d is then used to determine the weight of the seat occupant 20.

Preferably, fasteners 44 are used to mount the first 36 and second 38 portions to the first tracks 28 and lower structure 30, as shown in FIG. 4A. Any type of fastener known in the art can be used, such as rivets, bolts, screws, etc., for example. The fasteners 44 preferably include stepped portions 46 that are raised above/below the central bendable portion 40. The height of the stepped portions 46 can be varied depending on each specified type of seat mounting configuration. The stepped portions 46 provide for the formation of gaps 48, shown in FIG. 4B, between the sensor 32 and the track member 28 and between the sensor 32 and the lower structure 30 to facilitate bending.

Figure 4C:
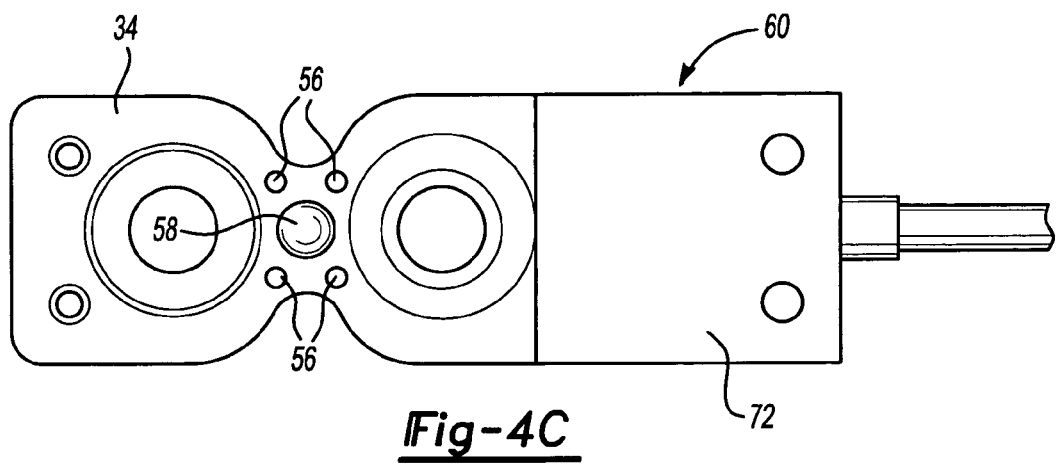
FIG. 4C is an overhead view the weight sensor assembly of FIG. 4B.

A strain gage assembly 50 is mounted to each of the sensors 32a, 32b, 32c, 32d to measure the amount of strain at the neck section 42. The sensors 32 have a top surface 52 facing the seat bottom 18 and a bottom surface 54 facing the lower structure 20. Preferably, a combination of four (4) grids 56 and associated electronics 58, forming a full bridge, are mounted on one of the top 52 or bottom 54 surfaces to measure the strain, as shown in FIG. 4C. Thus, the full bridge, known as a Wheatstone Bridge is used to measure the strain resulting from deflection or bending in the central portion 42 and concentrated at the neck section 42. The operation of a Wheatstone Bridge is well known in the art and will not be discussed in detail.

An electrical connector 60 is used to connect the sensor assemblies 32 to a central processing unit (CPU) or electronic control unit (ECU) 62. The beam member 34 includes an extension portion 64 at one end to which the electrical connector 60 mounts. The connector 60 is installed or inserted linearly along a longitudinal axis 66 by the beam member 34 to connect the strain gage 50 to the ECU 62. An electronics package 68 is mounted on the extension portion 64 and a plurality of traces 70 (only two are shown) are used to connect the grids 56 and associated electronics 58 to the electronics package 68. The electrical connector 60 interacts with the electronics package 68 and connects the electronics package 68 to the ECU 62 to allow signals from the strain gage 50 to be communicated to the ECU 62.

Figure 4D:
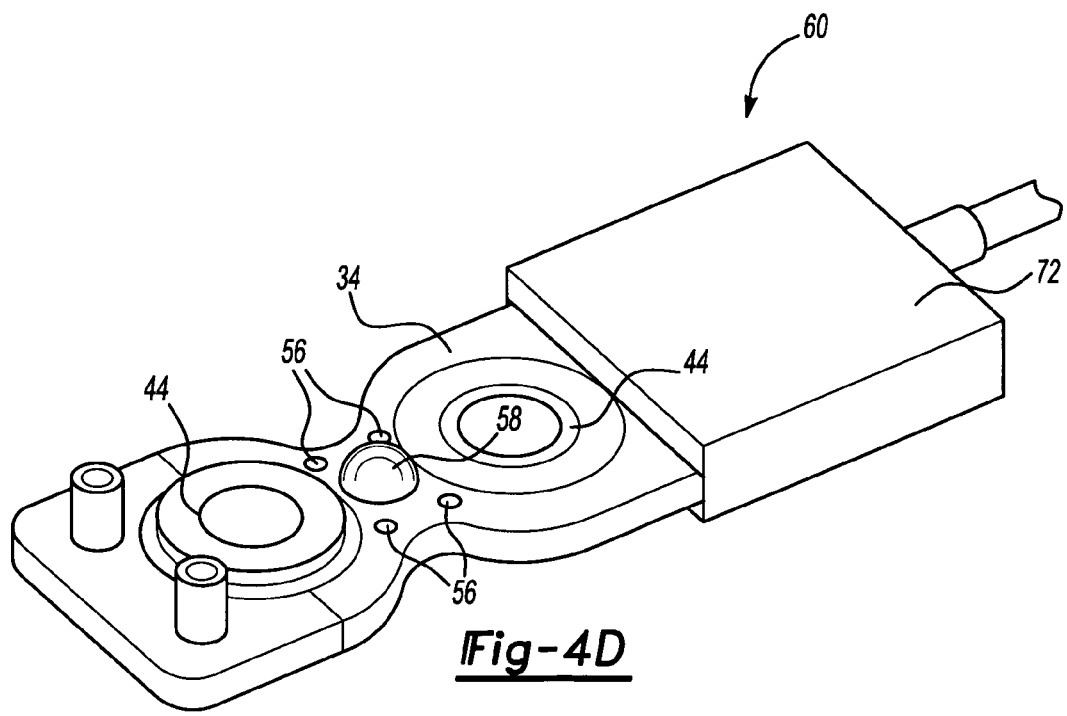
FIG. 4D is a perspective view of the weight sensor assembly of 4B.
Figure 6A:
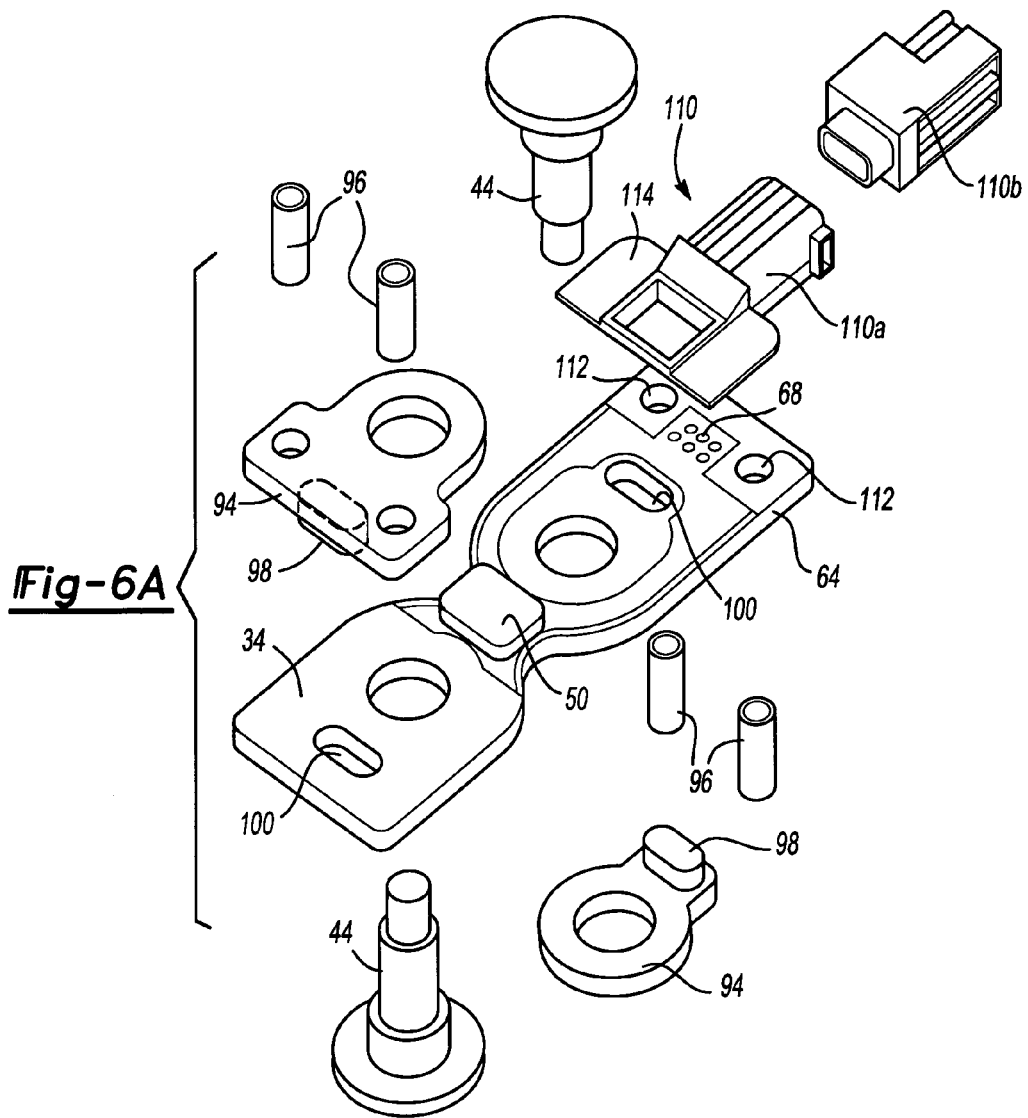
FIG. 6A is an exploded view of the subject weight sensor assembly with additional features.
Figure 6B:
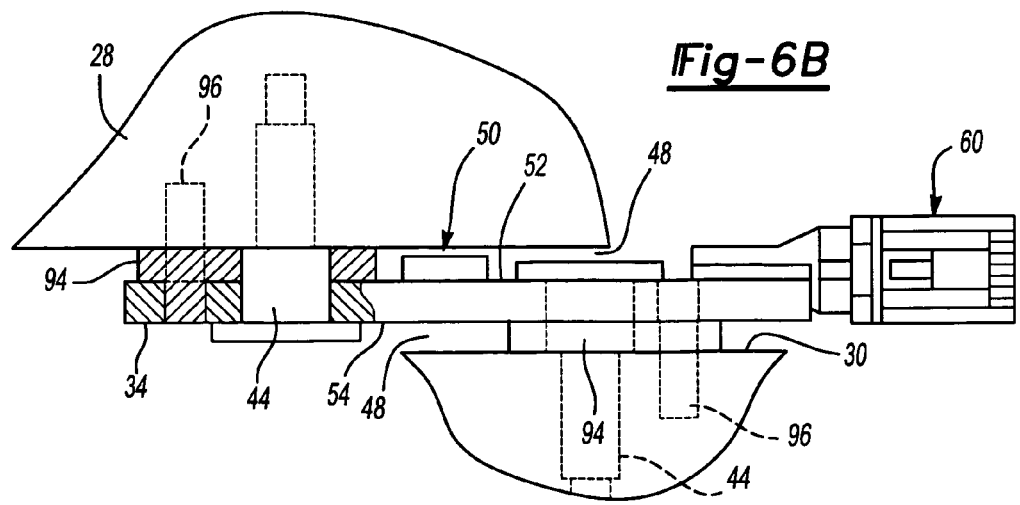
FIG. 6B is a side cross-sectional view of an assembled weight sensor assembly shown in FIG. 6A.
Figure 6C:
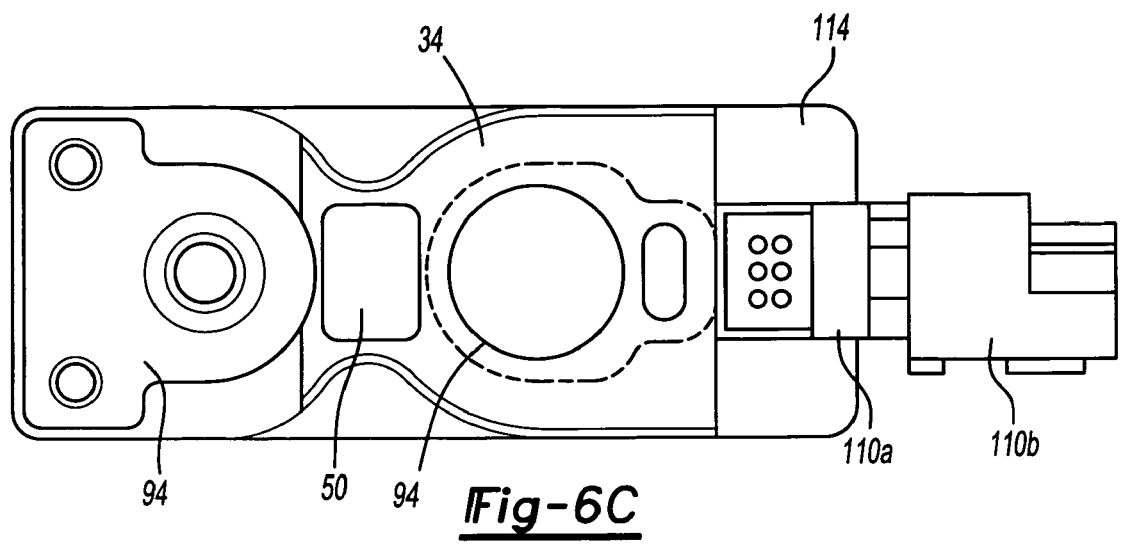
FIG. 6C is an overhead view the weight sensor assembly of FIG. 6B.
Figure 6D:
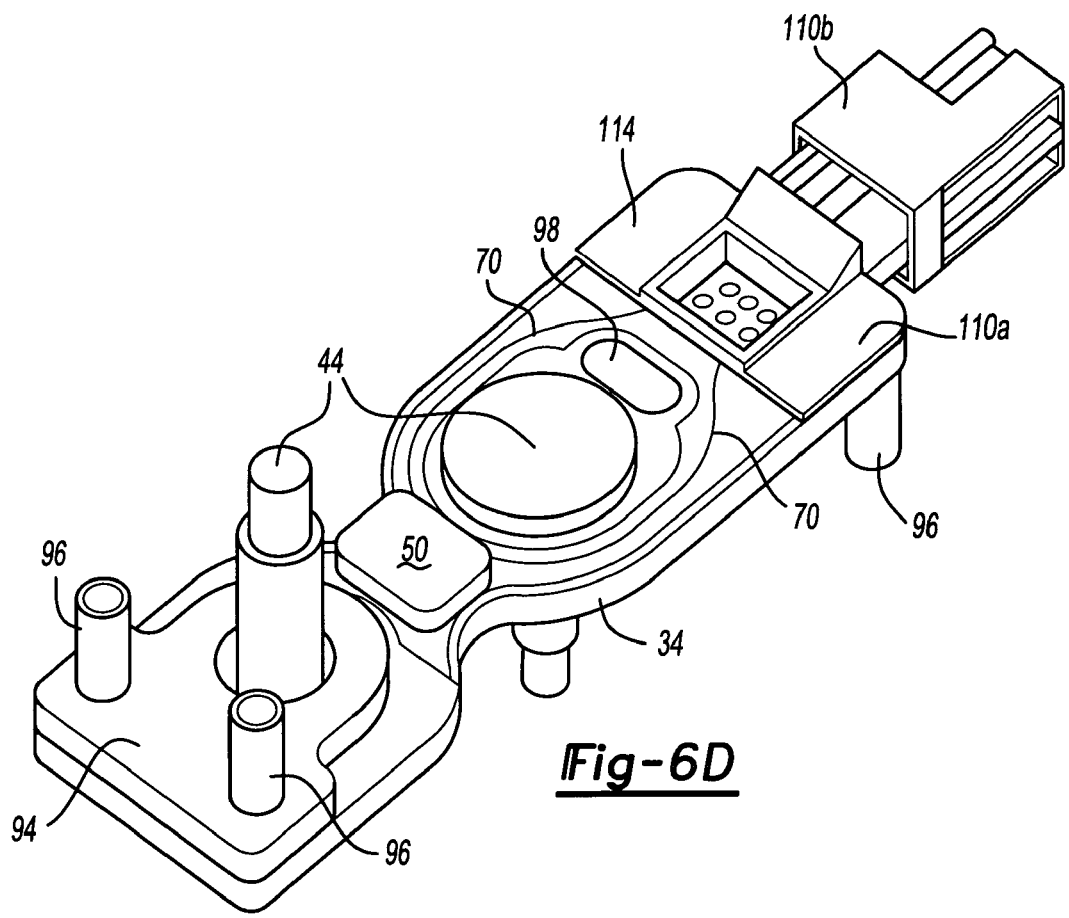
FIG. 6D is a perspective view of the weight sensor assembly of 6B.

Preferably, the weight sensor assembly uses thick film technology as is known in the art. This means that the strain gage 50 and the traces 70 are screen printed on the beam member 34. The electronics package 68 can also be screen printed on the beam member 34. Any type of known screen printing process can be used and the process itself will not be discussed in further detail. The connector 60 includes a plastic housing or rubber boot 72 that is used to protect the electronics package 68 from contaminants when the connector 60 is installed on the extension portion 64, as shown in FIG. 4D.

The beam member 34 and the mounting configuration is similar to a dual constrained cantilever beam. A first aperture 74 is formed at the first portion 36 of the sensor 32 and a second aperture 76 is formed at the second portion 38 of the sensor 32 for receiving the fasteners 44. The neck section 52 and strain gage 50 are preferably positioned between the apertures 74, 76 at an approximately equal distance from each aperture 74, 76. In order to achieve more accurate readings, the full-bridge strain gage 50 should have all strain gage components 56, 58 mounted on only one surface of the sensor 32. In other words, if the strain gage 50 is mounted on the top surface 52 then no strain gage components should be mounted on the bottom surface 54 or if the gage 50 is mounted on the bottom surface 54 then no strain gage components should be mounted on the top surface 52.

Figure 5:
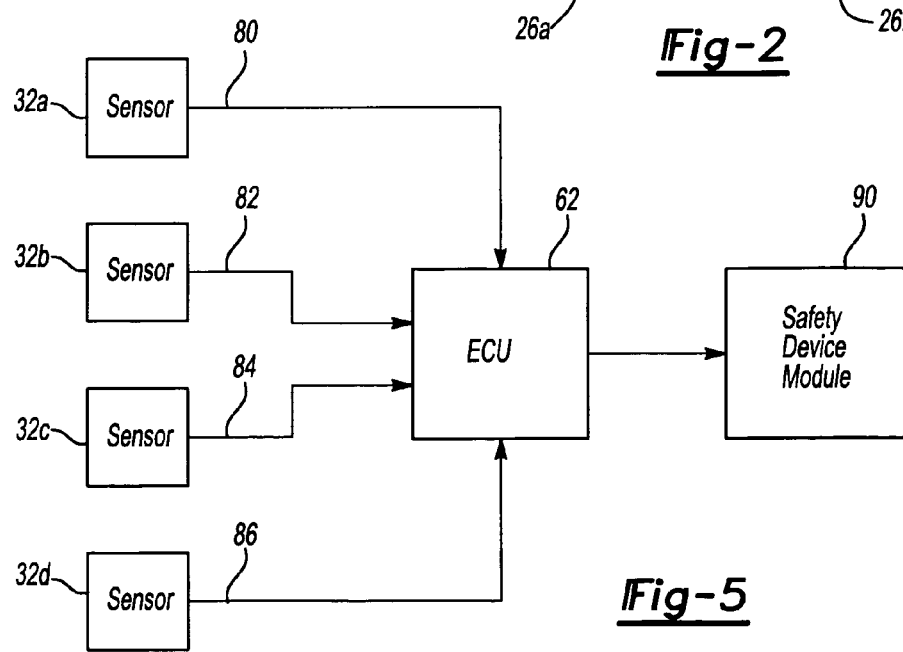
FIG. 5 is a schematic diagram for a control system for the subject invention.

The sensors 32a, 32b, 32c, 32d each generate a signal representative of the occupant weight that causes bending at the respective location of the sensors 32a, 32b, 32c, 32d, see FIG. 5. Thus, the first sensor 32a generates a first signal 80, the second sensor 32b generates a second signal 82, the third sensor 32c generates a third signal 84, and the fourth sensor 32d generates a fourth signal 86. The signals 80, 82, 84, 86 are transmitted to the ECU 62 as is known in the art. The ECU 62 combines the signals 80, 82, 84, 86 to determine the weight of the occupant 20. The ECU 62 then sends a control signal 88 to a safety device module 90. In one example, the safety device module 90 controls deployment force of the airbag 22. The ECU 62 could also be used to control other safety devices based on occupant weight.

Another feature that can be used with the sensor assembly 32 is shown in FIGS. 6A–6D. Instead of having stepped portions 46 formed on the fasteners 44 or in addition to the stepped portions 46, shims 94 can be used to control/vary the size of the gaps 48. Pins 96 or tab 98 and/or slot 100 attachment methods can be used to attach the shims 94 to the beam member 34. Other known attachment methods could also be used. The shims 94 are placed between the track member 28 and the beam member 34 and between the beam member 34 and the lower structure 30.

FIGS. 6A–6D also show an alternate embodiment electrical connector 110. The connector 110 is installed with a linear insertion force and is used to connect the electronics package 68 to the ECU 62, as discussed above. The electronics package 68 is moved closer to the end of the extension portion 64 and is preferably positioned between a pair of mounting holes 112. The traces 70 and strain gage 50 are preferably screen printed on the beam member 34 as discussed above. A first connector portion 110a is attached to the beam member 34 by snap attachment, gluing, or heat staking for example. A second connector portion 110b inserts into the first connector portion 110a to complete the connection to the ECU 62. An upper housing portion 114 mounts on the top surface 52 of the beam member 34.

The subject invention provides a unique apparatus for accurately measuring the weight of a seat occupant. Weight sensors 32 include a beam member 34 that acts as a dual constrained cantilever beam, concentrating the bending at the reduced neck section 42 that narrows in the middle of the beam member 34. The preferred hourglass shape, shown in FIGS. 4A–4D and 6A–6D provides sufficient strength for the sensor assembly 34 while also maintaining adequate signal output. To further simplify the sensor, the strain gage and traces are screen printed on the beam member 34. The screen printing process uses thick film technology that uses a printable ink resistor.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A weight sensor assembly for measuring a weight on a vehicle seat comprising:
    a bending beam having a first connection portion engageable with an upper seat structure and a second connection portion engageable with a lower seat structure wherein said bending beam defines a longitudinal axis and includes a mount for receiving an electrical connector via a linear insertion force along said longitudinal axis;
    a bendable central body portion coplanar with and extending between said first and second connection portions, said central body portion having a narrowing neck to concentrate strain in said central body portion; and
    a strain gage assembly mounted directly to said narrowing neck for measuring the strain at said central body portion resulting from a weight force being exerted against the upper seat structure.

2. The assembly according to claim 1 wherein said first connection portion includes a first aperture for receiving a first fastener and said second connection portion includes a second aperture for receiving a second fastener, said first fastener providing sole connection of said beam to the upper seat structure and said second fastener providing sole connection of said beam to the lower seat structure.

3. The assembly according to claim 1 including an electronics package mounted on said beam adjacent to said electrical connector.

4. The assembly according to claim 3 including at least one trace for electrically connecting said strain gage assembly to said electronics package.

5. The assembly according to claim 4 wherein said strain gage assembly, said at least one trace, and said electronics package are screen printed on said beam.

6. The assembly according to claim 1 wherein said bending beam includes an extension portion that extends beyond one of the first and second connection portions in a direction along said longitudinal axis, said extension portion forming said mount.

7. A weight sensor assembly for measuring a weight on a vehicle seat comprising:
    a bending beam having a first connection portion engageable with an upper seat structure and a second connection portion engageable with a lower seat structure wherein said bending beam defines a longitudinal axis and includes an extension portion extending beyond one of the first and second connection portions in a direction along said longitudinal axis, said extension portion including a mount for receiving an electrical connector via a linear insertion force applied along said longitudinal axis;
    a bendable central body portion extending between said first and second connection portions; and
    a sensor assembly comprising a first thick film portion applied directly to said central body portion for measuring strain resulting from a weight force being exerted against the upper seat structure wherein said sensor assembly generates a weight signal representative of said weight force.

8. The assembly according to claim 7 including an electrical component mounted to said extension portion of said bending beam for communicating said weight signal to a control unit and a plurality of traces interconnecting said electrical component and said sensor assembly.

9. The assembly according to claim 8 wherein said plurality of traces includes a second thick film portion formed contiguously with said first thick film portion.

10. The assembly according to claim 9 wherein said first and second thick film portions are screen printed on said bending beam using a thick film material.

11. The assembly according to claim 10 wherein said electrical component, sensor assembly, and plurality of traces are simultaneously screen printed on said bending beam using said thick film material.

12. The assembly according to claim 8 wherein said sensor assembly comprises a plurality of grids with associated electronics to form a full-bridge strain gage.

13. The assembly according to claim 12 including an electrical connector cooperating with said electrical component to communicate said weight signal to said control unit.

14. The assembly according to claim 7 wherein said central body portion is coplanar with said first and second connection portions and includes a narrowing neck to concentrate stain in said central body portion, said sensor assembly being attached to said central body portion at said narrowing neck.

15. The assembly according to claim 14 wherein said first connection portion includes a first aperture for receiving a first fastener and said second connection portion includes a second aperture for receiving a second fastener, said first fastener providing sole connection of said beam to the upper seat structure and said second fastener providing sole connection of said beam to the lower seat structure.

16. A method for forming a weight sensor assembly for a vehicle seat comprising the steps of:
   (a) providing a bending beam having a first connection portion engageable with an upper seat structure, a second connection portion engageable with a lower seat structure, and a bendable central body portion extending between the first and second connection portions along a longitudinal axis;
   (b) applying a thick film material to the central body portion to form a weight sensor assembly for measuring a weight exerted on a vehicle seat;
   (c) forming an extension portion extending beyond one of the first and second connection portions in a direction along the longitudinal axis and supporting an electrical component on the extension portion for connection to a control unit; and
   d) connecting the weight sensor assembly to the electrical component with at least one trace.

17. The method according to claim 16 wherein step (b) further includes depositing the thick film material on the central body portion by screen printing.

18. The method according to claim 17 wherein the electrical component communicates a weight signal generated by the weight sensor assembly to the control unit and wherein step (b) further includes applying the thick film material to contiguously form the weight sensor assembly, the at least one traces, and electrical component.

19. The method according to claim 18 including the step of enclosing the electrical component within a protective cover that surrounds the extension portion.

20. The method according to claim 16 including connecting an electrical connector to the extension portion by applying a linear insertion force in a direction along the longitudinal axis wherein the electrical connector connects the weight sensor assembly and electrical component to the control unit.

* * * * *